Aug. 30, 1927.
C. B. LEFFERT
1,640,360
LUGGAGE CARRIER FOR AUTOMOBILES
Filed May 8, 1925
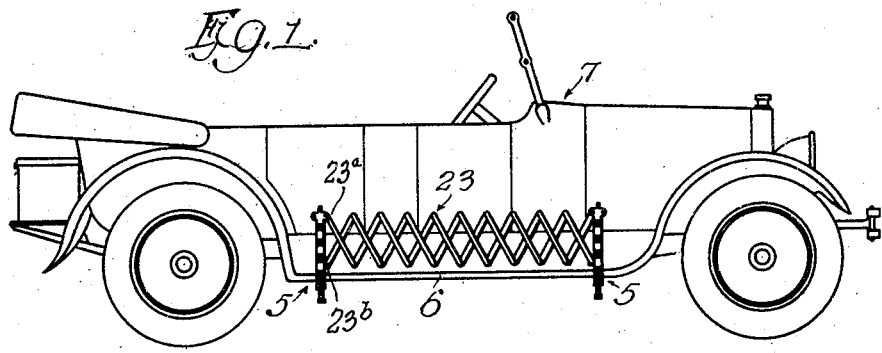
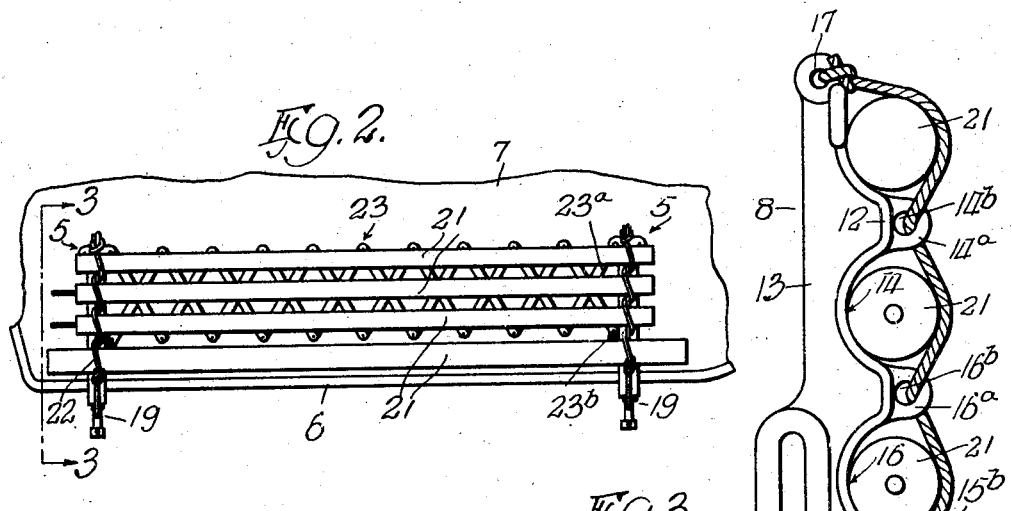
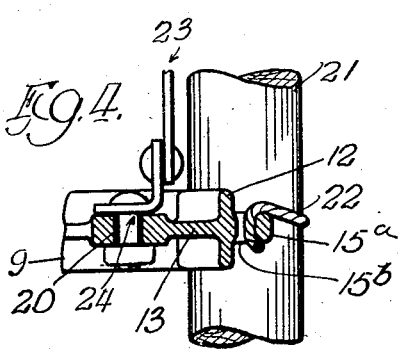
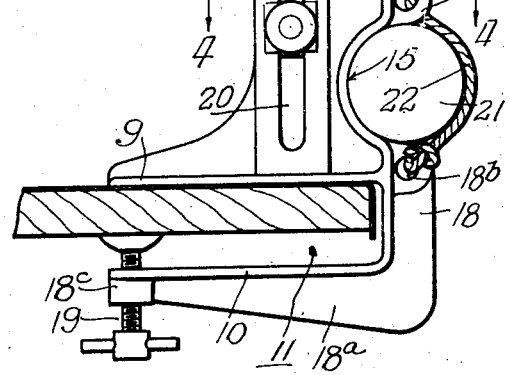
Charles B. Leffert INVENTOR
BY Arthur W. Nelson ATTORNEY Patented Aug. 30, 1927.

1,640,360

UNITED STATES PATENT OFFICE.

CHARLES B. LEFFERT, OF CHICAGO, ILLINOIS, ASSIGNOR TO UNITED STATES TENT & AWNING COMPANY, OF CHICAGO, ILLINOIS, A CORPORATION OF ILLINOIS.

LUGGAGE CARRIER FOR AUTOMOBILES.

Application filed May 8, 1925. Serial No. 28,803.

This invention relates to improvements in luggage carriers for automobiles and consists of the matters hereinafter described and more particularly pointed out in the appended claims.

One of the objects of the present invention is to provide a simple and efficient means whereby tent poles and a tent and other camp equipment, as well as other luggage, may be conveniently carried upon the running board of an automobile.

A further object of the invention is to provide a luggage carrier which comprises but two brackets adapted to be detachably secured to the running board of an automobile and so formed as to provide a novel pocket and slot arrangement, the pockets to removably secure the tent poles in a manner providing the guard between said brackets, and the slots to receive the ends of the well known lazy tong lattice guard so that luggage other than tent and camp equipment may also be readily carried.

Still another object of the invention is to provide such a carrier that may be made and sold at a reasonable price and which is so simple that its appearance will readily suggest to even a novice the operation thereof, as well as the manner of applying it to and removing it from an automobile.

These objects of the invention as well as others, together with the many advantages thereof, will more fully appear as I proceed with my specification.

In the drawings:—

Fig. 1 is a view in side elevation of an automobile having a running board to which my improved luggage carrier has been attached and shows the same as including the extensible lattice work guard for luggage other than tent equipment.

Fig. 2 is a fragmentary view in side elevation of the carrier with the tent poles in place to form the guard thereof, in addition to the lattice work.

Fig. 3 is a vertical sectional view on an enlarged scale as taken on the line 3—3 of Fig. 2.

Fig. 4 is a horizontal sectional view through one of the brackets as taken on the line 4—4 of Fig. 3.

Referring now in detail to that embodiment of the invention illustrated in the accompanying drawings 5—5 indicate two bracket or standard like members adapted to be detachably secured to the running board 6 of an automobile 7. As the brackets are substantially alike, a detail description of one will suffice for both. Each bracket is substantially L-shaped and comprises an upright portion 8 and top and bottom horizontal arms 9 and 10, respectively, which are vertically spaced apart as at 11 so that said arms will embrace marginal parts of the running board 6. The upright portion 8 is substantially T-shaped in cross section and includes a front flange 12 and a right angular web 13, the arms 9 and 10 merging into said flange 12. In the front flange of each bracket are provided a plurality of top, bottom and intermediate pockets or recesses 14, 15 and 16, respectively and extending forwardly from said flange 12 between said pockets are ears 14$^a$—15$^a$—16$^a$, in which are formed openings 14$^b$—15$^b$— and 16$^b$, respectively. The top end of the flange 12 above the ear 14$^a$ tapers in width to meet the web 13 and in said top end is provided an eye 17. On the front face of the web 12 below the pocket 15 is formed a forwardly extending web 18 which has a horizontal continuation 18$^a$ made integral with the bottom surface of the arm 10 in a manner to make the same strong and rigid. In the web 18 near the pocket 15 is provided a hole 18$^b$ associated with the apertured ears 14$^a$—15$^a$ and 16$^a$ before mentioned. The arms 9 and 10 are of substantially the same length and the free end of the bottom arm terminates in a boss 18$^c$ to receive the clamp screw 19. The major portion of the web 13 is increased in depth and is provided with a vertically extending slot 20 and a portion of said web is extended out to the end of the arm 9 so as to increase the strength thereof, as best shown in Fig. 3.

In use, the brackets are positioned a suitable distance apart on the running board and the arms 9 and 10 which embrace portions of said running board are clamped thereto by the associated clamp screws 19. If the particular luggage to be carried comprises a camping outfit such as a tent, the usual poles 21 thereof may be positioned in the pockets and secured therein by the cords 22 which are laced through the various openings in the bracket. Preferably, the cord associated with each bracket may be tied through one of the endmost holes and after lacing through the others, again tied to the other endmost holes therein. When the tent poles are thus in position, they provide a guard, back of which the remainder of the luggage may be conveniently placed and held by said guard from falling off the running board.

Should the luggage be other than a tent or the like wherein no poles are to be carried I provide a folding and extensible lattice guard 23 of the lazy tongs type with the end arms 23ª pivotally yet removably secured to the top ends of the brackets 8 as shown in Figs. 1 and 2 and with the endmost arms 23ᵇ vertically movable in, yet disconnectible from the slots 20 of the brackets 8 by means of the angle bracket and bolt construction 24 shown in Figs. 3 and 4.

However, as will be apparent, the lattice work guard may also be used even when tent poles are being carried because under such conditions the tent poles and lattice work will provide a double guard as best shown in Fig. 2. Thus, the poles may be carried advantageously and separated from the rest of the luggage, and it is then optional with the user whether or not he wishes to use the lattice guard with the tent pole guard. If not, the lattice work guard may be quickly removed, folded up and stored away. As said lattice work guard is capable of being folded into a compact bundle it may be easily stored under one of the seats of the automobile.

By the use of the pockets in the brackets and the cords associated therewith, the tent poles are easily placed and secured in position and are, therefore, advantageous over brackets having openings through which the poles must be inserted and manipulated endwise. The brackets shown and illustrated herein are preferably integral castings but as is apparent they may be of the fabricated strip kind without departing from the spirit of the invention.

While in describing my invention, I have referred to certain details of mechanical construction and arrangement of parts, I do not wish to be limited thereto except as may be pointed out in the appended claims.

I claim as my invention:

1. A luggage carrier embodying therein a pair of bracket members, each bracket member including an upright standard, means at the bottom end thereof for securing it to a running board, each standard having a plurality of depressions therein forming outwardly opening pockets in its front side to receive tent poles and also having devices between said pockets through which a cord may be laced to removably secure said tent poles in said pockets.

2. A luggage carrier embodying therein a pair of bracket members, each bracket member including an upright standard, means at the bottom end thereof for securing it to a running board, each standard having a plurality of depressions therein forming outwardly opening pockets in its front side to receive tent poles and also having outwardly extending apertured ears above and below said pockets through which a cord may be laced to removably secure said tent poles in said pockets.

3. A bracket for a luggage carrier comprising a standard, means at the bottom end thereof for securing it in place upon a running board, said standard having a front flange and a rear web, therein being transverse pockets formed in said flange and cord openings above and below each pocket, the said rear web having a vertically extending slot therein.

In testimony whereof, I have hereunto set my hand, this 8th day of April, 1925.

CHARLES B. LEFFERT.